Nov. 7, 1967  L. B. WILNER  3,351,880
PIEZORESISTIVE TRANSDUCER
Filed Oct. 26, 1966  2 Sheets-Sheet 1
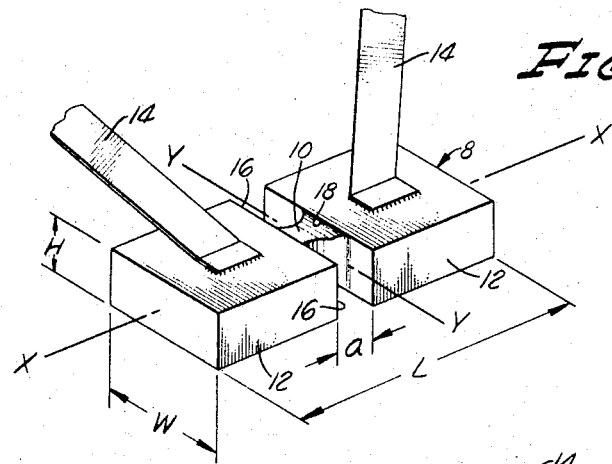
FIG. 1.
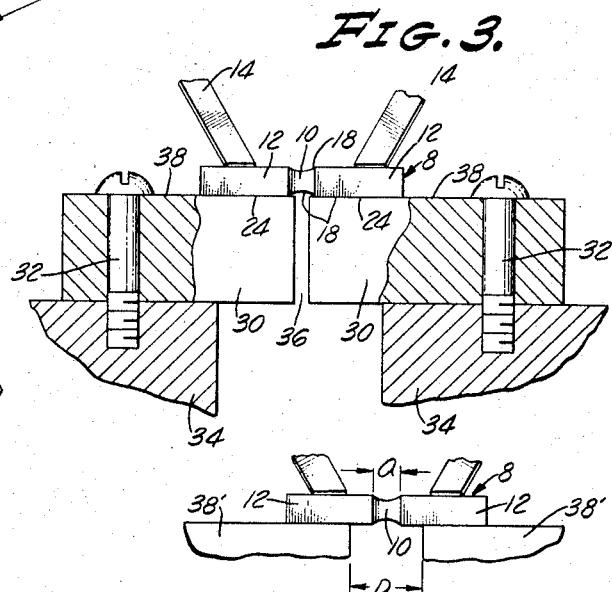
FIG. 3.
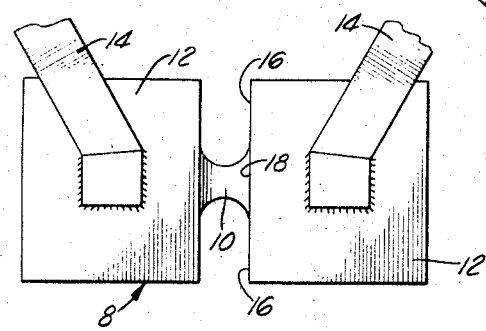
FIG. 2.
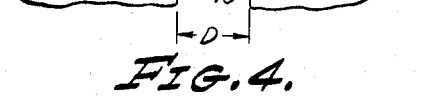
FIG. 4.
FIG. 5.
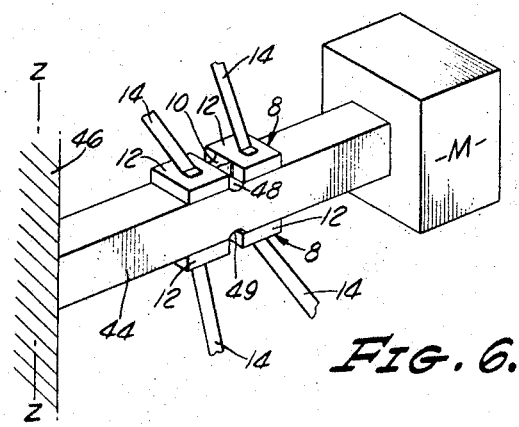
FIG. 6.
INVENTOR.
LESLIE B. WILNER
BY
*Rud b Lawlor*
ATTORNEY Nov. 7, 1967 L. B. WILNER 3,351,880
PIEZORESISTIVE TRANSDUCER
Filed Oct. 26, 1966 2 Sheets-Sheet 2

INVENTOR.
LESLIE B. WILNER
BY
ATTORNEY

United States Patent Office 3,351,880
Patented Nov. 7, 1967

3,351,880
PIEZORESISTIVE TRANSDUCER
Leslie B. Wilner, Palo Alto, Calif., assignor to Endevco Corporation, Pasadena, Calif., a corporation of California
Filed Oct. 26, 1966, Ser. No. 599,334
9 Claims. (Cl. 338—6)

ABSTRACT OF THE DISCLOSURE

An electromechanical transducer is provided which employs a piezoresistive element having a reduced neck of hour-glass configuration interconnecting two pads. The neck is in the form of an Euler column and has a length which is less than 17.3 times its minimum thickness, and the pads have transverse cross-sectional areas at least 10 times the minimum cross sectional area of the neck. Strain is detected by measuring the change in resistance between electrodes connected to the pads. The resistivity per unit length and the strain are both concentrated in the narrowest part of the neck, and heat developed at the neck is conducted through the flaring portions of the neck to the pads providing high sensitivity and a high degree of linearity.

This application is a continuation in part of my parent application, Ser. No. 364,673, filed May 4, 1964, now abandoned.

This invention relates to electromechanical transducers for converting mechanical displacements into electrical signals and more particularly to an improved strain sensitive element for use therein.

In many electromechanical transducers that are commonly employed, whether they be employed for measuring acceleration, velocity, pressure, or simply the relative displacement of two mechanical parts or the strain in a single mechanical part, a transducing element is utilized for detecting the relative displacement of two parts and for developing a corresponding electric signal. Such relative displacement has heretofore been measured with various kinds of strain gauges, some of which are of considerable weight, some of which are bulky, some of which are not very sensitive, and some of which are very expensive. Some of the strain gauge elements that have heretofore been employed as parts of transducers have been of the resistance type. Such strain gauge elements change electrical resistance when subjected to strain. Commonly, a resistance strain gauge is made of metal wire. Others have employed piezoresistive semiconductive materials.

As used in this specification, the terms strain gauge element refers to an element which is employed to measure displacements, forces or other physical phenomena due to the strain produced in the element. Such strain is also associated with a stress that occurs in the element concurrently with the strain. In practice, the strain gauge element is often employed as a force sensor, that is, it is mounted between two parts between which a force is applied and it is strained in an amount which depends upon that force.

The use of piezoresistive semiconductive materials in place of metal wire has the advantage that the change in resistance produced by the strain in the element is greater than it would be if the element was composed of metal, such as platinum, or Nichrome, or constantan. Whereas, in metal the change in resistance is due almost entirely to the change in length and cross-sectional area while maintaining a constant specific electrical resistivity, a much larger change in resistance is experienced with piezoresistive semiconductive materials. Suitable piezoresistive materials include semiconductors, such as silicon doped with boron, in which the effective resistivity changes when the material is subjected to strain. (By specific resistivity is meant resistance-per-unit length for an element of unit cross-section.) While piezoresistive semiconductive materials have proved to be more sensitive to strain than metal materials, they have been subject to serious disadvantages. More particularly, the response of strain gauge elements composed of such materials has been very non-linear, especially for high strains, they have been difficult to bond or attach to the object undergoing test, and they have been difficult to provide with electrodes.

In the present invention, a piezoresistive semiconductive element is provided of such a shape that it may be easily bonded to an object undergoing tests while leaving a reduced strain sensitive portion unbonded and spaced from the object undergoing tests. In this invention, the piezoeresistive semiconductive strain gauge element is in the form of a stiff reduced neck interconnecting two pads which are larger than the neck and which are provided with relatively large surfaces to provide relatively large areas for bonding the strain gauge element to two relatively movable parts. The neck is not only reduced in transverse dimensions compared with the pads, but in the best embodiment of the invention, the neck is very short and has a length that is less than the length of each of the pads. Furthermore, the reduced portion is of hour-glass configuration, that is, its cross-section is a minimum at some portion between the pads such as at its center and the cross-section gradually increases in each direction from the center as the pads are approached. The displacement between the pads and hence the displacement between parts of an object to which the pads are attached is determined by measuring a change in resistance of the element. In referring to various parts of the strain gauge element as being large or small or long or short, or the like, it should be borne in mind that it is the relative sizes to which reference is made, since the total length of the strain gauge element is normally less than one-fourth of an inch in the best embodiment of the invention.

The strain gauge element of this invention has many advantages.

One advantage lies in the fact that the displacement between the pads produced by relative motion of the two parts to which the pads are attached is concentrated in the narrowest part of the neck, thus in effect, mechanically amplifying the strain. Furthermore, the resistance per unit length of the element is greatest in the narrowest portion. As a result, the changes of resistance produced by a given displacement of the pads are compounded. In practice, this change of resistance is determined by means of electrical current flowing through the element from one pad to the other and measuring changes in voltage or other electrical properties resulting from changes in resistance.

But a problem arises because of the fact that the resistance per unit length is greatest in the narrowest part of the neck. Because of the flow of electrical current through the element, ohmic heating is concentrated in the neck, particularly in the narrowest portion thereof, causing the neck and particularly the narrowest portion to be heated more rapidly than the pads.

This invention is advantageous in that the pads provide thermal sinks which draw heat from the neck. Furthermore, the volume of each of the pads is much greater than the volume of the reduced portion so that the pads each have a very large thermal capacity compared with the neck. The flow of heat from the narrowest portion of the neck to the pads is aided by the flaring shape of the neck and further by virtue of the fact that the large surfaces of the pads are bonded to the object undergoing test and this object itself provides a thermal sink. As a result, even though heat is generated by the flow of electricity through the element the temperature of the pads increases only very slightly compared with the ambient temperature and they serve to draw heat away from the neck. For this reason, the temperature of the neck also rises only very slightly thus precluding large changes in the sensitivity of the device that might otherwise arise because of large changes in temperature of the neck.

In practice, the pads are either mounted upon a body of insulating material or alternatively, when the strain gauge element is to be attached to a metallic material, the pads are bonded thereto by means of insulating cement. By virtue of the size of the pads that are in contact with the body to which it is attached, a strong bond is established between the strain gauge element and such body thus obviating problems that would otherwise be encountered due to fracturing of the cement. In any event, electrical leads are connected to the pads.

In accordance with this invention, a strain gauge element is provided in which the ratio of the length of the neck to its minimum cross-sectional dimension is so small that the neck is not normally buckled when subjected to compressive axial forces but instead is crushed when the axial force exceeds the amount corresponding to the yield strength of the material. Thus, the maximum compressive force to which the strain gauge element can be subjected is determined by the yield strength of the material thereby precluding buckling, and hence failure, when a compressive force of a lower amount is applied. In this application, the term Euler column is employed to describe a column, such as the neck of the strain gauge element of this invention, which is characterized by the fact that when the column is subjected to compressive axial forces there is a threshold force above which crushing is caused, but below which buckling would not occur. It is to be observed that the term Euler column defines a characteristic of the column when tested under certain conditions. Even though the strain gauge element may be employed under other conditions, the strain gauge element remains an Euler column and has great strength and is less likely to be buckled even under these other conditions. One advantage of shaping the neck and proportioning the dimensions of the neck to render the element non-buckling lies in the fact that the strain gauge element may be employed to measure large compressive forces as well as large tension forces without subjecting the element to a pretension or bias force. However, it will be apparent that many of the advantages of the invention can still be attained if the element is only used in tension. The various details of construction, compositions of materials, and various properties of the strain gauge element of this invention are considered in more detail hereinafter.

In practice, the improved semiconductive piezoresistive strain gauge element of this invention is formed from a body of semiconductive material partly by mechanical techniques followed by etching or other chemical techniques, thus providing an element which is of the desired shape and which is substantially homogeneous throughout and thus is composed of the same type of semiconductive material, such as p-type material, from end to end.

Among the advantages of the strain gauge element and transducer of this invention are the following:

(1) The strain gauge element of this invention makes it possible to obtain a very high output for a given displacement between its ends.

(2) The employment of large pads, together with a reduced neck makes it possible to dissipate heat rapidly away from the reduced portion, thus making it possible to dissipate heat away from the reduced neck without bonding the neck itself to the object being tested.

(3) The gauge element is of low weight and small volume.

(4) By constructing the element as an Euler column, the element has a high stiffness, thus making it suitable for use in accelerometers or other devices which are designed to measure oscillatory movements up to high frequencies.

(5) At least when employed by attachment of its lateral faces to a pair of relatively movable segments in such a manner as to permit limited bending due to the eccentricity of loading, the strain gauge element of this invention exhibits a high degree of linearity.

(6) By constructing the strain gauge element as an Euler column it can be employed to detect compressive strains as well as tensile strains without the application of a prestressing force such as is required with wire strain gauge.

(7) The strain gauge element is capable of being used to detect and measure high strains.

The foregoing and other advantages of the invention, together with various features thereof, will be understood more fully from the following specification taken in connection with the accompanying drawings wherein:

FIG. 1 is a perspective view of the strain gauge element of this invention;

FIG. 2 is a top plan view of the strain gauge element;

FIG. 3 is an elevational view of a strain gauge embodying this invention;

FIG. 4 is an elevational view of another strain gauge element of this invention;

FIG. 5 is an elevational view of a strain gauge element employed as a strain gauge on the surface of an object under investigation;

FIG. 6 is a perspective view of a simple accelerometer embodying the invention;

Figure 7:
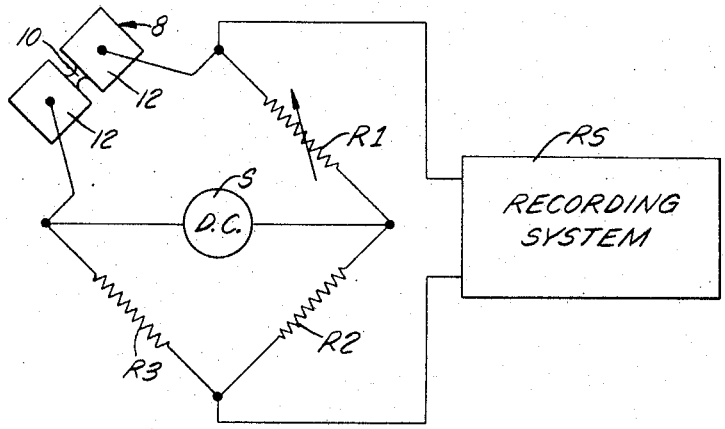
FIG. 7 is a wiring diagram of a bridge circuit employed for detecting changes in resistance of the strain gauge element.

In the specific embodiment of the invention illustrated in FIGS. 1 and 2, the strain gauge element 8 is in the form of a very small elongated block of piezoresistive semiconductive material having a reduced neck 10 of smooth hour-glass configuration separating two enlarged pads 12 and having a pair of electrical leads 14 conductively bonded to the pads. When the strain gauge element is to be used for measuring stress or strain or other similar physical characteristics, faces on the sides of the pads are bonded to mechanical parts and the neck between the pads remains unbonded as illustrated for example, in FIGS. 3, 4, 5, and 6. In any event, changes in resistance of the strain gauge element produced by tension or compression forces applied to the neck are measured to determine the stress, strain, or other physical characteristics under investigation.

In the embodiment of the invention illustrated, the semiconductive material consists of a single crystal of silicon doped with boron, the material being of the p-type. However, n-type material may also be employed. In either event, the pads and the neck are composed of the material of the same conductivity type and thus are inherently ohmic in nature. As a result, the voltage developed between the conductors is proportional to the current flowing through them independently of the direction of flow of the current and as will be seen hereinafter, the change in resistance of the element is the same linear function of the strain, both when the element is subjected to tension and when it is subjected to compression, over a wide range of strain.

Silicon semiconductive material of the p-type is especially advantageous to use since it has a higher Young's modulus, a higher yield point, and a higher gauge factor than n-type silicon material, when each type is used in its direction of greatest gauge factor.

The strain gauge element illustrated in FIG. 1 is in the form of a rod or block of rectangular cross-section. The element has an overall length L of approximately 0.25 cm., overall width W of approximately 0.13 cm., and a thickness of approximately 0.028 cm. Thus, the overall element 8 is substantially rectangular having a length that is about twice its width, although the element is not limited to the particular dimensions set forth. The reduced neck is formed by means of a pair of opposed notches 16 that lie on opposite sides thereof and by a second pair of notches 18 on the other sides thereof. The notches 16 have semi-cylindrical surfaces at their inner ends. The radii of these surfaces are about 0.015 to about 0.03 cm. The notches 18 are cut to a depth of about 0.007 cm. As a result, the reduced neck has a cross-section of about 0.015 cm. x 0.015 cm., the smallest section having an area of about 0.0002 cm.$^2$. The neck is very nearly of square cross-section, but is slightly rounded at the edges by chemical etching. The neck is joined by outwardly flaring portions that connect the neck to the pads by means of smooth curves, and the cross-sectional area of each of the pads in planes perdendicular to axis of the element is at least about ten times that of the neck.

The cross-section of the neck enlarges continuously as the pads are approached from the narrowest portion of the neck; thus there are no straight portions extending along the axis of the neck, aiding in maximizing the resistance per unit length and the strain in the narrowest portion of the neck. Thus, there is only one portion of the neck that is narrowest, that is, which has the minimum cross-section. The large pads provide heat sinks and also provide areas for firmly bonding the strain gauge element to an object undergoing tests.

In the best embodiment of the invention, the portion of the strain gauge element that lies between the pads, that is, the neck of the element, is an Euler column of stubby, smooth hour-glass configuration. The element is used with its neck free of any lateral support. In the best embodiment of the invention, the length of the neck is less than that length which could result in buckling when the neck is subjected to compressive axial forces. The ratio of length to thickness applicable depends in part upon the Young's modulus of the material, its yield strength, the exact shape of the element, and also the manner in which the ends are supported. It can be shown that for a semiconductive element of uniform cross-section having an elastic modulus of 27,200,000 p.s.i. and a yield strength of 300,000 p.s.i., the element will fail by yielding rather than by buckling where the ratio of length to minimum thickness is about 8.6 if the ends are free to pivot and about 17.3 if they are constrained to move axially, when subjected to axial compressive forces. This ratio will be larger when employing a neck that is reduced relative to the other parts as when the neck is of hour-glass configuration. In this application the ratio of the length of the neck to its minimum cross-sectional dimension is made less than about 4 in order to take advantage of these and other physical phenomena. As a result, a strain gauge element is produced in which the strain and resistance are concentrated over a very small distance thus attaining high gauge factor and high strain leverage.

The entire element, including both the pads and the neck, is also in the form of an Euler column in the best embodiment of the invention, though this not always essential to the operation especially where, as in the application of the invention illustrated, faces on the sides of the pads are bonded to another object or to a pair of relatively movable mechanical parts, thus restraining the pads against free pivotal action. In those cases where the strain gauge element is in the form of an Euler column, if longitudinal compressive forces are applied along the longitudinal axis X—X, the element would not bend or buckle but would gradually enlarge or thicken at the neck until it is crushed irrespective of whether the pads are capable of pivoting. While buckling could occur if the element were of great length so that, in effect, the element would be a rod or bar, still the neck, that is the portion of the element between the pads, has properties of an Euler column when viewed in terms of forces applied to the element at the portions of the pads nearest the neck. In other words, in the best embodiment of the invention, the neck is an Euler column.

As used herein, the term Euler column applies irrespective of whether the ends of the column are free to pivot or are constrained to move only axially. It can be shown that a column with its ends so constrained may be twice as long as one with the ends pivoted and still be free of buckling. In the present case, the pads are constrained and are not free to pivot, and parts of the pads are bonded, thus reducing their effective length so far as a tendency to buckle is concerned, this increasing the length to thickness ratio permissible for use for the entire element without buckling. In such a case though, the entire element does not act as an Euler column when forces are applied to its ends. Still, when the portions of the element beyond the neck are bonded to other devices that constrain the movement of those portions along the length of the element or nearly so, the element is non-buckling and acts an an Euler column. In the present case, the ratio of total length to minimum thickness is about 16.

The importance of employing a reduced neck that is non-buckling lies in the fact that the strain gauge element may be compressed up to the crushing point without buckling. This facilitates measurement of compression-like strains as well as tension-like strains over a large range of strain without biasing the unit with a static tension force. This, in effect, doubles the range of strain which can be measured. With such a reduced neck, even though the forces may not be applied axially, but may be applied to the faces of the pads, the piezoresistive semi-conductive element has high strentgh, thus, in effect, protecting it against breakage when subjected to excessively high forces. This feature is advantageous even though the piezoresistive element is usually employed in a range of strain that is only a small fraction of the large range over which it is capable of being used without breakage.

By employing the neck of hour-glass configuration in which the cross-section changes continuously from one end of the neck to the other, danger of fracture due to concentration of strains at a discontinuity of the slope are reduced, thus also adding to the strength of the strain gauge element.

In FIG. 3 there is illustrated an electromechanical transducer in the form of a very simple strain gauge employing the strain gauge element of this invention. The transducer of FIG. 3 comprises a pair of bars 30 which are fastened by means of two screws 32 to a pair of relatively movable mechanical parts 34. The two bars are separated by a small gap 36. The two bars have coplanar faces 38 to which a strain gauge element 8 of the type represented in FIG. 1 is bonded. The two lower faces 24 of the strain gauge element 8 are bonded to the faces 38 by means of an insulating cement. For best effects, the thickness of the gap 36 is made less than the length of the neck so that the entire faces 24 of the pads are bonded to the surfaces 38. The neck itself is not bonded to the bars directly and hence is free of lateral constraints. High bonding strength is attained by employing pads which have lengths and widths which are greater than the length of the neck and which have thicknesses that are greater than the minimum cross-sectional dimension of the neck.

Thus, the piezoresistive semiconductive strain gauge element of this invention is characterized in part by the fact that the thickness of the neck is less than the thickness of the pads and the length of the neck is less than the length of the pads.

With the strain gauge represented in FIG. 3, when the two mechanical parts 34 are displaced toward or away from each other, the change in spacing is communicated through the bars 30 and the pads 12 to the reduced neck 10. As a result, the neck is strained, changing in both length and cross-section. These changes are concentrated in the narrowest part of the neck where the resistance-per-unit length of the strain gauge has its highest value. In effect, the stubby hour-glass configuration provides strain leverage, in that the strain in the narrowest portion of the neck is far greater than the strain would be, if the thickness of the neck were uniform between the points of attachment to the bars 30, or even between the pads. This strain leverage increases the sensitivity of the strain gauge element. By sensitivity is meant the fractional change in resistance ($\Delta R/R$) divided by the fractional change in length ($\Delta a/a$) or strain to which the neck is subjected between the faces of the pads that are bonded to surfaces of the bars 30 or other strain producing mechanical parts. As a result of the high sensitivity achieved with this invention, high output can be obtained for a given displacement.

In the strain gauge of FIG. 3, the pads are bonded to the bars 30 throughout the lengths of the pads. In an alternative embodiment of the invention illustrated in FIG. 4, the distance D between the mechanical faces 38' of the mechanical parts to which the pads are bonded is greater than the length $a$ of the neck. In this case, portions of the pads 12 adjacent the neck remain unbonded. In any event, the displacement $d$D occurring between the bars 30 is taken up by the neck 10 at its narrowest portion, thus achieving strain leverage. The strain leverage is somewhat greater than the ratio $D/a$. For this reason and because the electrical resistance per unit length of the neck is greatest at its narrowest part where the strain is greatest, it is clear that by employing a strain gauge element of hour-glass configuration, greater sensitivity to strain can be attained than otherwise.

It will be noted that the parts of the pads remote from the lower faces 24 that are bonded to the faces 38 and 38' of the object undergoing investigation are unbonded. As a result when the two parts to which the faces are bonded are moved relative to each other, shearing forces are applied to the pads, causing the neck to be flexed as well as strained. In other words in the gauge of this invention, the shearing forces applied to faces of the pads result in an angular rotation of transverse cross-sectional planes of the neck about an axis that is parallel to the faces of the pads and is perpendicular to the length of the neck. Thus the ends of the neck are rotated slightly by stress thereby subjecting the neck to flexure as well as to tension or compression. Thus, for example, when the two mechanical parts 34 are moved relative to each other in a direction parallel to the axis X—X, the strain gauge element 8 not only stretches and shrinks, but also flexes, bending or arcing relative to the axis X—X about a horizontal axis Y—Y transverse thereto (see FIG. 1). By virtue of the combined strain of the element 8 and its flexing, the proportional change in resistance of the strain gauge element is more nearly linear than it would otherwise be, both for positive strains and for negative strains.

Figure 9:
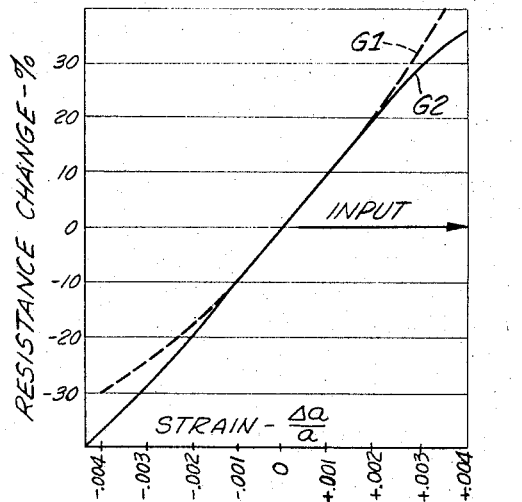
FIG. 9 is a graph employed in explaining some of the electrical properties of the strain gauge of this invention.

The manner in which the resistance of the element 8 varies with strain is indicated in FIG. 9. In this figure, ordinates represent percentage change in resistance while abscissae represent strain. In this case, the strain $\Delta a/a$ is expressed as the fractional increase in the length of the neck in terms of the total length of the neck. However, as mentioned previously, the strain actually varies along the axis X—X being a maximum at the midsection of the neck. The values of $\Delta a/a$ shown in the drawings were estimated from measurements made of changes of displacement between two points on a metal body to which the gauge was bonded and remote from the neck of the gauge but along the axis thereof.

In FIG. 9, the dashed graph G1 represents the change in resistance that is measured when the strain gauge element 8 is strained along its axis X—X without bending. Such measurements are made by mounting the strain gauge element 8 in a device suitable for applying forces axially along the length while constraining the pads to prevent bending. Graph G2 represents changes in resistance observed when the strain gauge element 8 is bonded at its lower faces to a pair of relatively movable elements such as the elements 30 which apply a shearing strain to the strain gauge element through its lateral faces. With this arrangement, when the pads are pressed toward each other, the gauge bends or bows upwardly being in effect convex on its upper side, and when the pads 12 are drawn apart, the gauge bends or bows downwardly being in effect concave on its upper side.

The linearizing effect exhibited in graph G2 of FIG. 9 was attained in a specific embodiment of the invention like that described above by virtue of the rotational stiffness resulting from the shape of the gauge and the bonding of the faces of the pads to two rigid bodies relatively movable only along a line parallel to the axis of the gauge. The combination of the bending with the tension or compression attained in the neck was about the same as that which would be caused by a tensile or compressive longitudinal load applied to a flat rectangular Euler column having a uniform transverse cross-section, but with the load displaced from the central axis toward a broad face of the column by about one-eighth the distance of that axis from that face.

FIG. 5 illustrates how the strain gauge element may be bonded directly to the surface 40 of an object such as an airplane wing that is subject to strain. In this case, no gap is present opposite the neck 10 between the parts of the mechanical element to which the strain gauge element 8 is attached. But in this case too, the entire strain that occurs over the length of the neck 10 is concentrated at the narrowest part of the neck, thus achieving strain leverage as heretofore described.

FIG. 6 is a simple type of accelerometer making use of this invention. In this accelerometer, a mass M is fastened to one end of a flexible arm 44, the other end of which is firmly attached to an object 46 undergoing oscillatory or other acceleration along an axis Z—Z that is perpendicular to the length of the bar 44. In this case, assuming that the axis Z—Z is vertical and the bar 44 has a flat upper surface, one strain gauge element 8 is fastened to the bar 44 on opposite sides of a groove 48 cut in the upper surface of the bar and another is fastened on opposite sides of a second groove 49 cut in the lower surface of the bar. The grooves establish a hinge at which the bending of the bar is greatest, thus increasing the sensitivity of the unit.

In this particular accelerometer, the upper strain gauge element is extended when the lower strain gauge element is compressed, and is compressed when the lower strain gauge element is extended. Thus, the resistance of one of the strain gauge elements increases when the resistance of the other strain gauge element decreases.

There are, of course, numerous ways in which the changes in resistance of the strain gauge element of this invention may be measured or otherwise utilized, all within the knowledge of those skilled in the strain gauge art. In all cases, care is exercised to insulate the pads 12 from each other except through the neck 10 in order to avoid shorting or shunting the neck through an external circuit. Such insulation may be established most easily by bonding the strain gauge elements to the objects to which they are attached with insulating cement, that is cement having low electrical conductivity.

For illustrative purposes, a bridge circuit that may be employed to record the changes in strain is illustrated in FIG. 7. There it will be noted that the strain gauge element 8 and resistances R1, R2 and R3 are connected in the four arms of the bridge. A DC signal from a source S is supplied to one diagonal of the bridge and a recording system RS, such as a conventional amplifying system and recording oscillograph, is connected to the other diagonal of the bridge circuit. In this case, the bridge circuit may be unbalanced by manipulation of the values of the resistors such as by adjustment of a variable resistor R1. The bridge is so unbalanced that the polarity of the signal that is fed to the recording system always remains the same throughout the range of strains to be detected regardless of the value of the resistance of the strain gauge element 8.

Figure 8:
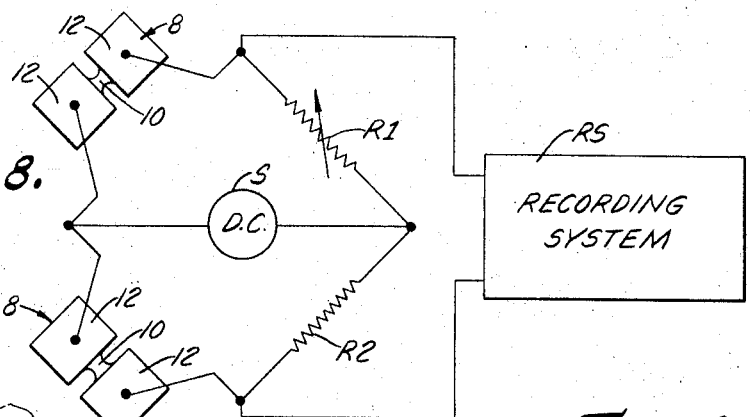
FIG. 8 is a wiring diagram of a bridge circuit employed for detecting differential changes in resistance of two strain gauge elements.
Figure 10:
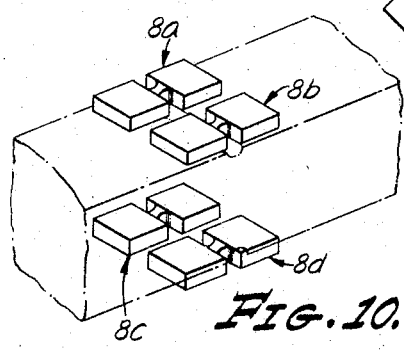
FIG. 10 is a perspective view of another simple accelerometer embodying the invention.
Figure 11:
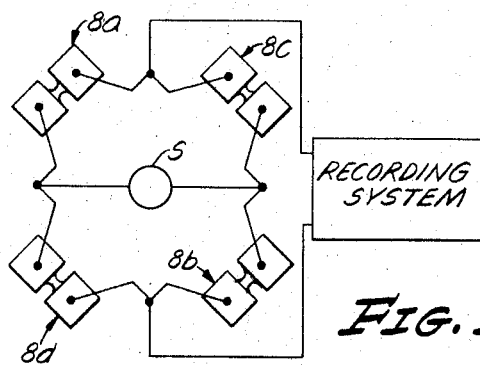
FIG. 11 is a wiring diagram of another bridge circuit employed for detecting differential changes in resistance of two pairs of strain gauge elements.

The bridge circuit of FIG. 8 may be employed to detect changes in the difference in resistance between the two strain gauges of the accelerometer of FIG. 6 during measurement of acceleration. In this case also, the bridge is unbalanced so that the polarity of the signal that is fed to the recording system remains the same regardless of the sign of the acceleration. In another form of the accelerometer illustrated in FIG. 10, one pair of strain gauges 8a and 8b are employed on the upper side of arm 44 and another pair of strain gauges 8c and 8d are employed on the lower side. In such a case, the effects of the strains produced may be added by connecting the gauges of each pair in opposite arms of a four arm bridge as indicated in FIG. 11.

Various kinds of piezoresistive semiconductor material may be employed in the strain gauge element 8. The most satisfactory material now known is a single crystal of p-type silicon that has been doped with a small proportion of boron. Other suitable semiconductor materials include suitably doped germanium, doped silicon carbide, and doped gallium arsenide.

A material having a resistivity of 3 ohm-cm. at room temperature while the material is not subject to strain has proved to be very satisfactory. With such a material, the strain gauge element having the dimensions described above has a resistance of about 350 ohms. This value of resistance makes the strain sensitive element very satisfactory for use in a strain gauge for many reasons which are well known. For one thing, the resistance is sufficiently low to avoid excessive pickup of stray signals induced from power lines and the like, but is sufficiently large to facilitate matching with other resistors in a bridge circuit or otherwise matching impedances of an amplifying system, whether they be of the solid-state type or of another type. Generally, a resistance between 10 ohms and 3000 ohms is most satisfactory.

This invention makes possible the construction of strain gauges which use high gauge factor material and still do not exhibit extreme changes in characteristics due to ohmic heating, in spite of the fact that the strain-sensitive part thereof is not intimately bonded to the object undergoing test. To appreciate the advantage of applicant's invention in this regard, one should bear in mind that the gauge factor is a property of the material employed and is equal to the percentage change in resistance produced by a 1% change in the length of a rod of the material that is of uniform cross-section. As is well known, the gauge factor is high for semiconductive materials with low doping and decreases as the doping is increased. However, the temperature coefficient of resistivity also decreases as the doping is increased.

With prior art strain gauges of wire shape and composed of piezoresistive semiconductive material, high gauge factors of over 150 can be employed by virtue of the fact that such strain gauges can be bonded throughout their length to the object under test so that such strain gauges readily dissipate their heat. In the present invention, such high gauge factors are also usable by virtue of the thermal properties of the neck in relation to the enlarged pads even though the strain sensitive portion is not bonded to the object under test. In applicant's invention the heat generated in the neck is readily conducted through the pads to the object under test. For this reason, temperatures throughout the strain gauge element are maintained nearly uniform even under conditions where heat generation varies. Thus, with this invention, high gauge factor is obtained by the use of semiconductive material of low doping in spite of the fact that the strain sensitive element is not intimately bonded to the object under test throughout the length of the strain gauge element as is the case with wire type strain gauges. At the same time, the strain gauges of this invention are free of the difficulty of bonding metal leads to the small ends of the strain gauge of the wire type that are composed of semiconductive material.

The maximum positive strain, or elongation, that can be detected depends upon the yield strength of the material, that is, the yield point of the strain gauge element when stretched. The maximum negative strain, or compression, that can be detected depends upon the maximum load which can be withstood by the strain gauge element without crushing. Measurements of this resistance change are facilitated by the fact that large currents can be carried through the neck of the strain gauge element without overheating. In practice, it is found that changes in resistance of ±20%, and even ±40%, occur over the range of strain whch can be measured without damage to the strain sensitive element.

The sensitivity of a piezoresistive semiconductive strain gauge element depends upon the direction in which the strain is applied relative to the crystal structure. In the case of p-type silicon, maximum sensitivity is obtained in the [111] direction. For this reason, the strain gauge element is made with the axis X—X along the [111] direction of the crystal. For best results the strain sensitive element is formed of a single crystal.

By employing a piezoresistive element of the type described herein in which a reduced neck portion interconnects a pair of pads which are adapted for fastening to a pair of relatively displaceable elements and also are adapted for connection to an electrical circuit, an electromechanical transducer can be provided which has a small volume and low weight and high sensitivity and which, under some circumstances, has an exceptionally high degree of linearity for both compressive strains and tension strains over a wide range.

It will, of course, be understood that the invention is not limited to the exact construction described herein, but that the strain gauge element of this invention may be embodied in many other forms and may be composed of other materials and may be incorporated in electromechanical transducers in other ways, all within the scope of the appended claims.

The invention claimed is:

1. In a system for converting mechanical movements of two interconnected parts of a mechanical device into electrical signals, a strain sensitive element comprising a unitary member composed of a piezoresistive semiconductive material and having two pads interconnected by and separated by a reduced neck, the semiconductive material of which said pads and said neck are formed being of the same semiconductive type, said reduced neck and said pads lying on a common axis, each of said pads having a face extending generally in the same direction as said axis, the length of said neck being less than the length of said faces along said axis, the minimum thickness of said neck being less than the thickness of said pads in a direction normal to said axis, the cross-section of said neck enlarging continuously as the pads are approached from the region of minimum thickness of said neck, said two faces of said pads being respectively bonded to said relatively movable parts and said neck being unbonded with respect to said relatively movable parts, the parts of said pads remote from said faces being unbonded, a pair of electrode means electrically connected to said respective pads, said pair of electrode means constituting the only electrode means connected to said strain-sensitive element, and means for connecting said pair of electrode means to measure changes in the electrical resistance of said strain-sensitive element due to relative movement of said two interconnected parts.

2. In a system for converting mechanical movement of two relatively movable parts of a mechanical device into electrical signals, a strain-sensitive element comprising a unitary member composed of a piezoresistive semiconductive material and having two end portions interconnected by and separated by an intermediate neck portion, all said portions being composed of a single type of semiconductive material, said neck portion and said end portions lying on a common axis, said neck portion having a length that is less than the length of each of said end portions along said axis and having a minimum thickness that is less than the thickness of said end portions transverse to said axis, said two end portions having a pair of aligned faces extending generally in the same direction as said axis, said neck portion being bounded by at least one exposed surface that is spaced inwardly toward said axis from said aligned faces of said end portions, the cross-section of said neck portion enlarging continuously as the end portions are approached from the narrowest portion of said neck portion, said two end portions having surfaces which are respectively bonded directly to said relatively movable parts, said neck portion being unbonded with respect to said relatively movable parts, the parts of said end portions remote from said bonded surfaces being unbonded, whereby the electrical resistance of said strain-sensitive element between said end portions changes as a nearly linear function of such mechanical movement when said neck is subjected to stress resulting from said movement, and a pair of electrode means electrically connected respectively to said two end portions for detecting changes in said electrical resistance, said pair of electrode means constituting the only electrode means connected to said strain sensitive element.

3. A strain sensitive element comprising:

a unitary member composed of a piezoresistive semiconductive material, said unitary member being adapted to be subjected to stress along an axis, said unitary member having a reduced neck separating two enlarged portions, said neck and said enlarged portions lying along said axis, said neck and said enlarged portions all consisting of a single type of semiconductive material, said neck being of hour-glass configuration and having a cross section which increases continuously as each said enlarged portion is approached from the narrowest portion of said neck, said neck having the properties of an Euler column, and a pair of electrode means electrically connected to the respective enlarged portions on opposite sides of said neck for monitoring changes in the electrical resistance between said enlarged portions when said strain sensitive element is subject to strain along said axis, said pair of electrode means constituting the only electrode means electrically connected to said strain sensitive element.

4. A strain sensitive element comprising:

a unitary member composed of a pierzoresistive semiconductive material, said unitary member being adapted to be subjected to stress along an axis, said unitary member having a reduced neck separating two pads, said neck and said pads lying along said axis, said neck and said pads all consisting of a single type of semiconductive material, the thickness of the neck at its narrowest portion in a direction transverse to said axis being less than the thickness of each of said pads in said transverse direction, and the length of the neck in a direction along said axis being less than the length of each of said pads along said axis, the cross-section of said neck enlarging continuously as said pads are approached from said narrowest portion of said neck, and a pair of electrode means electrically connected to the respective pads on opposite sides of said neck for dedecting changes in the electrical resistance between said pads when said strain sensitive element is subject to strain along said axis, said pair of electrode means constituting the only electrode means connected to said strain sensitive element.

5. A strain sensitive element as defined in claim 4 wherein the ratio of the length of the neck along said axis to its thickness at the narrowest portion thereof, transverse to said axis is less than 4.

6. A strain sensitive element as defined in claim 4 wherein said pads are provided with coplanar flat faces respectively positioned on opposite sides of said neck and wherein electrode means are bonded to said pads on further sides thereof spaced from said flat faces.

7. A strain sensitive element as defined in claim 4 in which the ratio of the cross-sectional area of each of said enlarged pads is at least ten times the cross-sectional area of said neck at the narrowest portion thereof.

8. A strain sensitive element as defined in claim 4 wherein the ratio of the length of said neck to its thickness at the narrowest portion thereof is less than 17.3, and the ratio of the cross sectional area of said pads to the minimum cross sectional area of said neck in directions transverse to said axis is greater than 10.

9. A strain sensitive element as defined in claim 4 wherein the ratio of the length of said neck to its thickness at the narrowest portion thereof is less than 17.3.

References Cited

UNITED STATES PATENTS

| | | | |
|---|---|---|---|
| 2,486,625 | 11/1949 | Allen | 338—6 |
| 2,829,075 | 4/1958 | Pankove | 317—235 |
| 2,987,659 | 6/1961 | Teszner | 317—235 |
| 3,075,160 | 1/1963 | Starr | 338—5 |
| 3,089,108 | 5/1963 | Gong et al. | 338—2 |
| 3,130,383 | 4/1964 | Hottinger | 338—5 |
| 3,176,203 | 3/1965 | Teszner | 317—235 |
| 3,201,665 | 8/1965 | Venables | 317—235 |
| 3,215,568 | 11/1965 | Pfann | 338—2 |
| 3,275,907 | 9/1966 | Blackford | 317—234 |
| 3,295,029 | 12/1966 | Fister | 317—234 |

RICHARD M. WOOD, *Primary Examiner.*

W. D. BROOKS, *Assistant Examiner.*